United States Patent [19]

De Angelis et al.

[11] 4,346,443

[45] Aug. 24, 1982

[54] REGULATION AND CONTROL SYSTEM FOR THE FUEL FEEDING UNIT OF AN INTERNAL-COMBUSTION ENGINE

[75] Inventors: Giancarlo De Angelis, Milan; Alberto Catastini, Corsico; Aldo Bassi; Edoardo Rogora, both of Milan; Dario Radaelli, Legnano; Luciano Bertoloni, Milan; Francesco Perrone, Novara, all of Italy

[73] Assignee: Alfa Romeo S.p.A., Milan, Italy

[21] Appl. No.: 184,630

[22] Filed: Sep. 8, 1980

[30] Foreign Application Priority Data

Sep. 10, 1979 [IT] Italy .............................. 25586 A/79

[51] Int. Cl.$^3$ .............................................. G06F 15/50

[52] U.S. Cl. ............................... 364/431.04; 123/480; 123/486

[58] Field of Search ............................... 123/480, 486; 364/431.04

[56] References Cited

U.S. PATENT DOCUMENTS

| | | | |
|---|---|---|---|
| 4,201,159 | 5/1980 | Kawai et al. | 123/480 |
| 4,257,377 | 3/1981 | Kinugawa et al. | 123/480 |
| 4,259,723 | 3/1981 | Fujisawa et al. | 364/431.04 |
| 4,290,107 | 9/1981 | Suda et al. | 123/480 |

OTHER PUBLICATIONS

"The Use of Microprocessors as Automobile On-Board Controllers," by Temple et al., Computer, pp. 33-36, 8/74.

"Seamp Microprocessor Aims to Replace Mechanical Logic," by Morris et al., Electronics, pp. 81-86, 9/75.

*Primary Examiner*—P. S. Lall

*Attorney, Agent, or Firm*—Charles E. Brown

[57] ABSTRACT

This invention relates to a regulation and control system for the fuel feeding unit of an internal combustion engine, said system being based on the use of a microprocessing unit which has properly been programmed. A set of detectors of engine parameters supplies the microprocessing unit with a set of input data which are processed in the processing unit and converted into a set of output data which are representative of the regulated magnitudes, more exactly of the duration and phase setting of the fuel feed.

2 Claims, 1 Drawing Figure

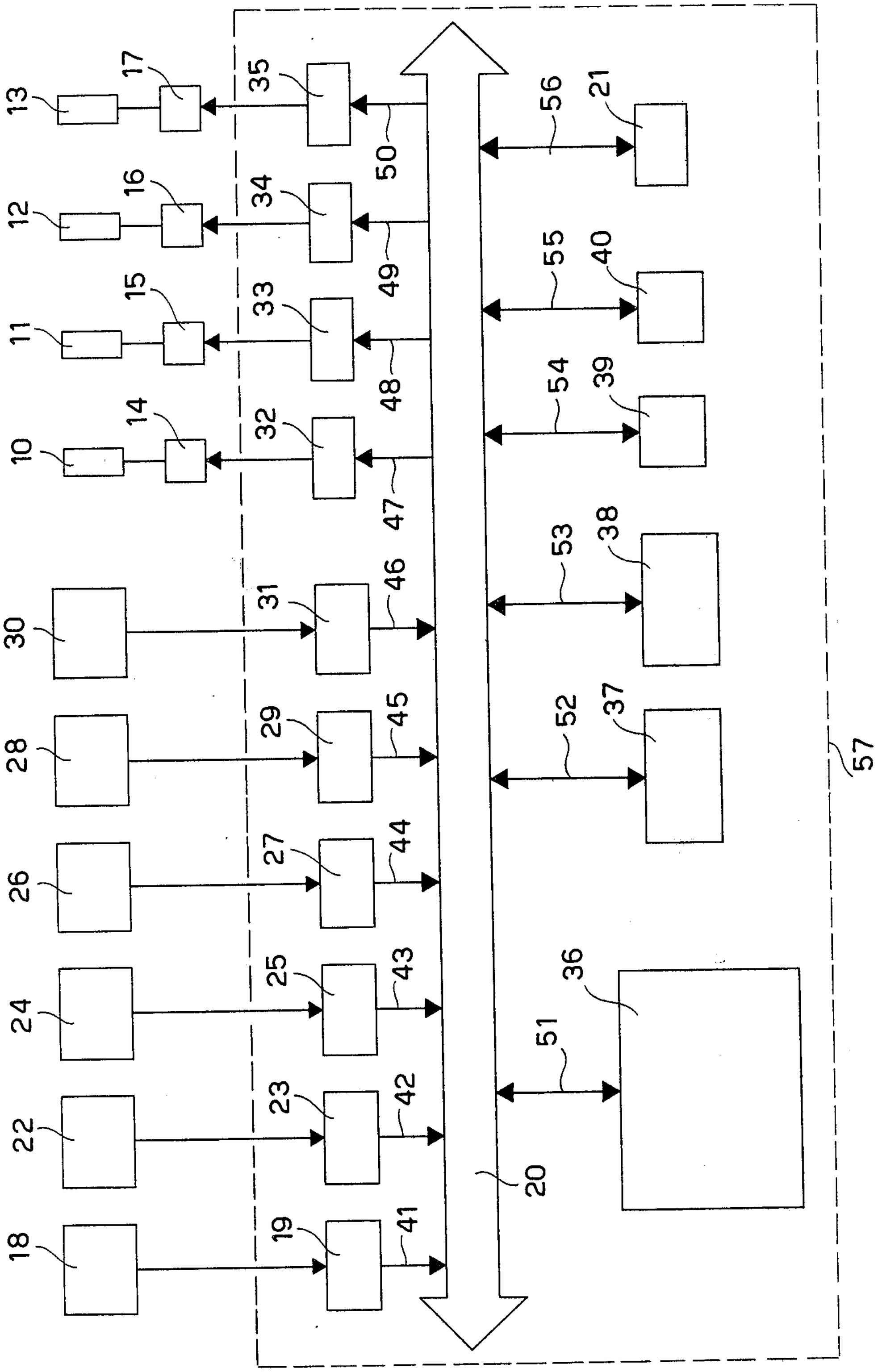
10
11
12
13
14
15
16
17
18
19
20
21
22
23
24
25
26
27
28
29
30
31
32
33
34
35
36
37
38
39
40
41
42
43
44
45
46
47
48
49
50
51
52
53
54
55
56
57

REGULATION AND CONTROL SYSTEM FOR THE FUEL FEEDING UNIT OF AN INTERNAL-COMBUSTION ENGINE

It is known that the present-day internal combustion engines for motor vehicles are fed with rather lean mixtures and that, for the engines to be adopted in the future, leaner and leaner mixtures are forecast in use, in order that the fuel consumption may be reduced and the polluting unburned components in the exhaust gas be minimized.

Engines fed with a lead mixture, however, operate under more critical conditions than the engines fed with a stoichiometric or even fat mixture, and possible errors in fuel metering may prejudice the inflammability of the mixture. Such engines thus require also ignition units which are capable of priming between the sparking plug electrodes arcs having an adequate intensity and lifetime, with an ignition advance which is accurately controlled in order that partial ignition or even ignition failures may be prevented from occurring.

In order that such shortcomings may be offset, the adoption of electronic regulation and control units is becoming more and more widespread.

The most updated electronic regulation and control units for the fuel feed and for the ignition unit are those of the cabled logic type matched with a microprocessor digital logic, or also of the microprocessor digital logic type only.

In the former types, the task of timing the regulated magnitudes (phasing of injection and phasing of ignition) and the power end stages are made with a cabled logic, whereas the quantification of the regulated magnitudes such as the duration of the injection and advance of ignition is achieved by the use of digital techniques which require the calculation of functions and the analysis of tabulated data and is carried out by a microprocessor which has been purposely programmed.

In the units of the second kind referred to above, only the power end stages are embodied by a cabled logic, whereas the timing function and the quantification of the regulated magnitudes are carried out by a microprocessor unit which has properly been programmed.

In the systems of the first named kind, it is comparatively easy to modify the quantification of the regulated magnitude to vary the performances of the engine consistently with the running requirements, if the timing rules remain unaltered, because a variation of the latter rules would generally require a substantial revision of the cabled logic design.

Those systems which are entirely embodied by a microprocessor digital logic afford an utmost versatility in that both the timing and the quantification of the regulated magnitudes can be varied by modifying the microprocessing program.

In addition, the microprocessor units afford the maximum reliability and safety in use on account of the extremely reduced number of the component parts.

Also from the point of view of the first cost, the latter systems are cheaper since the adoption of high integration technologies in the manufacture of the microprocessors considerably reduces the assemblage and production costs.

It is the subject matter of the present invention an electronic control and regulation unit for feeding the fuel to an internal-combustion engine, said unit being based on the use of a microprocessing unit which is programmed for performing preselected operation sequences which, at every calculation cycle, permit to obtain, from the input data consisting of preselected engine operational parameters, the output data which are the regulated magnitudes, that is, the quantification (duration) and the timing (phasing) of the fuel feed.

An object of the present invention is to provide a control and regulation system having an accuracy, a reliability and a response rapidity which are adequate to the high performances required of the engine and to the times in which the various engine operations take place.

Another object of the present invention is to provide a control and regulation system the construction cost of which is advantageous for mass production.

The regulation and control system according to this invention is provided for the unit of fuel feed to an internal combustion engine, said engine being equipped with air intake ducts and actuators for feeding the engine with fuel, said regulation and control system comprising a first detector of a first engine operational parameter, capable of delivering a discrete number of values taken by such a parameter, each of said values being formed by a preselected number of bits, a second detector of a second engine operational parameter capable of delivering a discrete number of values taken by said parameter, each of said values consisting of a preselected number of bits, each couple of values of said first and said second parameters defining an engine operational condition, a third detector of an operational temperature of the engine, capable of delivering a discrete number of values taken by such temperature, each of said values consisting of a preselected number of bits, a first pulse generator operatively connected to the mainshaft and capable of delivering at every engine revolution a pulsed signal composed by a number of pulses equal to the number of fuel-dispensing operations which must take place during each engine revolution, a second pulse generator operatively connected to a shaft rotated at half the RPM of the mainshaft and capable of emitting a properly phased pulse at evey engine cycle, a central microprocessor unit or control processor unit (CPU), a reading and writing storage unit or random access memory (RAM), a reading only storage unit or read only memory (ROM) containing the calculation programes of the microprocessor unit, the carburation plan of the engine as a function of the two engine operational parameters aforesaid, the carburation correction plan as a function of an engine working temperature, the cells of the storage unit (ROM) relative to the carburation plan containing each, an information for metering the fuel consisting of a preselected number of bits, the value of which is a function of the quantity of fuel to be fed to the engine at every dispensing step, in the operational condition defined by a couple of values of the two engine operational parameters aforesaid, all the other engine operational parameters being assumed constant, the number of the storage cells being equal to the number of the possible combinations of the values taken by a preselected number of most significant bits of the first engine operational parameter and of the values taken by a preselected number of most significant bits of the second engine operational parameter, the cells of the storage unit aforesaid (ROM) relative to the plan of carburation correction containing, each, an information the value of which is the correction coefficient of the fuel metering as a function of the values taken by said working temperature of the engine, said central microprocessor units being programmed;

for generating an address of the reading only storage (ROM) composed by the combination of the aforementioned preselected number of the first most significant bits of the numerical value taken by said first engine operational parameter and by the aforesaid preselected number of the first most significant bits of the numerical value taken by the second engine operational parameter;

For identifying by means of such address that cell of the reading only storage in which a first metering information is contained;

for identifying in said reading only storage, in addition to said first metering information three additional metering information pieces, each of which corresponds to the content of the storage cells located in a preselected environmental domain of said address, each of the three cells being identified by algebraically summing certain preselected constants to said address;

for obtaining from the aforesaid four metering information pieces a metering information calculated by an operative interpolation process, the operative elementary module of which uses a preselected number of the least significant bits of each of said first and said second engine operational parameter;

for identifying in said reading only storage the cell containing the correction coefficient corresponding to the engine working temperature, and for utilizing said correction coefficient to modify said calculated correction information according to a preselected procedure;

for calculating from the thermally corrected metering information the utilized metering information expressed in terms of the control magnitude required by the fuel feeding actuators for the engine, the value of said control magnitude being obtained by calculations based on algorythms depending on the operational features of said actuators, and for calculating the instant of command of said fuel feed actuators, utilizing the pulsed signals coming from said first and said second pulse generators, the pulses coming from the first generator being utilized or distinguishing the starting sequential order for the same actuators within a cycle of the engine and for determining the instant of start of each actuator, the pulses coming from the second generator being utilized for defining the beginning of each engine cycle.

More particularly, the regulation and control system outlines above is to be applied to a phased electronic injection installation, comprising, as the actuators for fuel feed, as many electroinjectors as there are cylinders in the engine which require to be driven by a command magnitude which is their duration of dispensing, said regulation and control system being characterized in that it comprises timers having a counting up capacity correlated with the desired accuracy, the number of said timers being a function of the number of injections to be effected during a revolution of the engine and of the maximum duration of the injection, said microprocessor central unit being programmed;

for converting the thermally corrected metering information into an injection duration information, which is the stay open time of an electroinjector, said duration information being expressed in terms of number of constant frequency pulses, calculated as a function of the characteristic operation curve of the electroinjector, starting from said thermally corrected metering information;

for controlling the dispensing by an electroinjector, identifying the injector to be actuated and the instant of start of the actuation, via the pulsed signal delivered by said first pulse generator;

for determining the dispensing time of said electroinjector, by loading on a timer the number of constant frequency pulses, which represents said injection duration time information, carrying out the loading process of said timer as a function of the dynamic condition of the engine evaluated through the degree of variation of one of said engine operational parameters;

for associating, during the entire dispensing time, a determined timer to the electroinjector which is being actuated, on the basis of an algorythm which, as a function of the characteristics of the dispensing, permits to drive the electroinjectors with a number of timers equal to one half the number of the electroinjectors, and for controlling the closure of the electroinjector on completion of the last count up of said timer.

Features and advantages of the invention will be better understood by examining the accompanying block diagram drawing which shows a preferred embodiment of the invention.

The regulation and control system shown in the drawing is applied to a phased electronic injection unit of a 4-cylinder, 4-stroke internal combustion engine.

There are shown at 10, 11, 12, 13 the electroinjectors which dispense the fuel into the air intake ducts, and there are indicated at 14, 15, 16, 17 the actuators of power stages of said electroinjectors. At 18 there is indicated a detector of an engine operational parameter, in the case in point the rotational speed of the engine, which can be, for example, of the kind described in the U.S. patent applications Ser. Nos. 886,438 filed Mar. 14, 1978 and granted on Oct. 21, 1980 as U.S. Pat. No. 4,229,695 and 62,481 filed July 31, 1979 and granted on Apr. 6, 1982, as U.S. Pat. No. 4,323,976.

The detector 18 is capable of delivering, via the interface 19, a pulsed signal the period of which is proportional to the rotational speed of the engine. The interface 19, which is connected, via the connection 41, to the parallel interconnection line 20, permits, concurrently with each pulse coming from the detector 28, to be able to stop the principal program to permit the performance of a first auxiliary program which controls the operation of the counter 21.

The microprocessor unit 36, utilizing the counter 21, detects such a period and delivers in a discrete number the values taken by the rotational speed in the field of operation of the engine, said values being expressed by 8 bits.

There is indicated at 22 a detector for another engine operational parameter, in the case in point the angle of the throttling butterfly(ies) of the air drawn in by the engine. The detector 22 is capable of delivering in a discrete number the values taken by the angle aforesaid during the butterfly stroke: said values are expressed by 8 bits. The detector 22 is connected by the interface 23 and the connection 42 to the parallel interconnection line (bus) 20.

Each operative condition of the engine is identified by a couple of values of the rotational speed and the throttle angle.

There is shown at 24 a detector of the temperature of the air drawn in by the engine, and there is indicated at 26 a detector of the temperature of the engine-cooling liquid, each of these detectors being capable of delivering, in a discrete number, via the interfaces 25 and 27, the values taken by the two temperatures aforementioned. These values are expressed by 5 bits.

The connections 43 and 44 connect the interface 25 and 27 to the parallel interconnection line 20.

There is indicated at 28 a pulse generator operatively connected to the main shaft and capable of delivering at each engine revolution, a pulsed signal composed by a number of pulses equal to the number of fuel dispensing steps that are desired at every revolution of the engine, or, as an alternative, equal to the the number of electroinjectors to be driven to open in an engine revolution. In the case of a 4-cylinder, 4-stroke engine with phased injection, two pulses per revolution are necessary, separated by the period of time existing between the intake stages of two cylinders which are consecutive in the ignition sequence.

There is indicated at 29 an interface which connects the generator 28 by the connection 45 to the parallel interconnection line 20.

The latter interface permits, concurrently with each pulse coming from the generator 28, to be able to stop the principal program for permitting the performance of a second auxiliary program for controlling the operation of the timers 39 and 40 which determine the duration of the injection step.

There is indicated at 30 a pulse generator operatively connected to a shaft which is rotated at a speed equal to one half of that of the engine, said generator 30 being capable of delivering a properly phased pulse at every engine cycle. An interface indicated at 31 and a connection 46 connect the generator 30 to the parallel interconnection line 20.

The interface 31 makes it possible, concurrently with the pulse coming from the generator 30, to stop the principal program for permitting the performance of a third auxiliary program which checks the correct timing relationship of the injection steps.

The actuators 14, 15, 16, 17 for the electroinjectors 10, 11, 12, 13 are connected to the parallel interconnection line 20 through the electric adaptation interfaces 32, 33, 34, 35 and the connections 47, 48, 49, 50.

There is indicated at 36 a microprocessor central unit (CPU) connected by the connection 51 to the interconnection line 20; there is indicated at 37 a reading only storage unit (ROM) connected by the connection 52 to the interconnection line 20. There is indicated at 38 a reading and a writing storage unit (RAM) connected by the connection 53 to the interconnection line 20.

The timers 39 and 40 are connected by the connections 54 and 55 to the interconnection line 20: the counter 21 is connected by the connection 56 to the interconnection line 20. At 57 there is indicated, generally, the microcomputer.

In the reading and writing storage 38 (RAM) there are contained, from time to time, the values obtained from the detectors and the values to be forwarded to the actuators for the electroinjectors. There are contained also all the values of the intermediate magnitude generated during the calculation and necessary for the performance of the programs.

In the reading only storage (ROM) 37 there are contained the principal program, its sub-programs, the three auxiliary program used by the microprocessor unit 36, the carburation plan of the engine as a function of the engine rotational speed and of the angle of the throttle(s) and the plan of correction of the carburation as a function of the temperature of the drawn in air and the plane of correction of the carburation as a function of the temperature of the engine coolant.

In the read-only storages 37 there could be loaded also other plans of correction of the carburation, such as correction as a function of the negative pressure in the intake ducts of the engine and of the pressure of the ambient air.

The storage cells relative to the carburation plan contain, each, a fuel metering information composed by 8 bits, the value of which is proportional to the quantity of fuel to be injected into the engine at each dispensing step of an electroinjector, in the operational condition defined by a couple of values of the rotational speed of the engine and the angle of the throttle or throttles, all the other engine parameters being assumed to be constant.

The number of the storage cells is equal to the number of the possible combinations of values taken by the first five bits which are the most significant for the rotational speed of the engine and the values taken by the first most significant bits of the throttle(s) angle.

In the case in point the storage cells are 1024 since 32 are the values of the rotation speed and 32 the values of throttle angle which are used. The storage cells relative to the plan of correction of the carburation contain, each, an information, the value of which is expressed by 8 bits and represents the coefficient of correction of the fuel metering as a function of the values taken by the temperature of the drawn in air and, respectively, by the temperature of the engine coolant.

The operation of the regulation and control system as described above is as follows.

The microprocessing unit receives, in the first place, the magnitudes which define the operational conditions of the engine: more particularly, from the detector 22, via the interface 23, it receives the throttling angle, from the detectors 34 and 26, via the interfaces 25 and 27, it acquires the air temperature and the temperature of the engine coolant.

The rotational speed is received in a manner which is asynchronous relative to the principal programme, by exploiting the pulsed signal coming from the detector 18. More particularly, in correspondence with a first pulse, the microprocessing unit 36 effects the following operations:

it stops the performance of the principal program;

it resets and commands the start of the count up of the counter 21;

it restarts the performance of the principal program;

In correspondence with a second pulse, the microprocessing unit 36 performs the following operations:

it stops the performance of the principal program;

it detects the number of pulses summed up by the counter 21 resets the counter 21 and restarts the count up by the latter counter;

converts the number of pulses summed up in an information of 8 bits proportional to the rotational speed, according to the algorythm described in the above mentioned U.S. patent application No. 62,481;

restarts the performance of the principal program.

The procedure performed starting from the second pulse is repeated for all the pulses which follow, so that the information of the rotational speed is updated at every 180-degree rotation of the engine.

When starting the calculation cycle for the duration of the injection, the microprocessing unit 36 composes the storage address by combining the first 5 most significant bits of the value, as sent by the detector 22 of the throttle angle with the first 5 most significant bits of the value, as sent by the detector 18, of the engine rotational speed.

The 10-bit address thus obtained is utilized by the microprocessing unit 36 to identify the cell of the storage 37 which relates to the carburation plan and which contains the metering information, that is, a value, $q_1$, which is proportional to the quantity of fuel to be injected into the engine at each dispensing step of an electroinjector.

The microprocessing unit 36 also identifies in the same storage 37 three further cells which contain the metering information pieces $q_2$, $q_3$, $q_4$, each of which is obtained by algebraically summing up certain constants with the relative address or with the first information piece $q_1$.

The address of the cell $q_2$ is obtained by sumling one unit to the address of the cell $q_1$. The address of the cell $q_3$ is obtained by summing 32 units to the address of the cell $q_1$ and the address of the cell $q_4$ is obtained by adding 33 units to the address of the cell $q_1$.

The use of the constants aforementioned is a consequence of the manner in which the information pieces are arranged in the storage of the carburation plan. The metering information pieces for a constant throttling angle are grouped blockwise in blocks of 32 consecutive cells, because there have been used the 5 most significant bits of the throttling angle to form the 5 most significant bits of the storage address.

Each of said blocks contains metering information pieces corresponding to increasing values of rotational speed because there have been utilized the 5 most significant bits of the rotational speed to form the 5 least significant bits of the storage address.

The microprocessor unit 36, by prosecuting its calculation program obtains, from said four metering information pieces $q_1$, $q_2$, $q_3$, $q_4$ a calculated metering information $\bar{q}$, obtained through an operational interpolation process which in the operational elementary module utilizes the last three least significant figures of the values of the rotational speed and throttle angle supplied by the detectors 18 and 22.

The elementary operational module is repeated three times, the first time it is applied to the values $q_1$ and $q_2$ and permits to calculate the intermediate value $q_{12}$, utilizing the three least significant figures of the rotational speed; the second time it is applied to the values $q_3$ and $q_4$ and permits to calculate the intermediate value $q_{34}$ by utilizing the three least significant/figures of the rotational speed, the third time it is applied to the values $q_{12}$ and $q_{34}$ and permits to calculate the intermediate value q by utilizing the three least significant figures of the throttle angle.

One of the elementary operative modules used consists in multiplying a first metering information ($q_1$, $q_3$ or $q_{12}$) by the complement to 8 of the three least significant figures and in multiplying the second metering information ($q_2$, or $q_4$ or $q_{34}$) by the value of the three least significant figures; the two products thus obtained are summed and divided by 8.

The adoption of the interpolation procedure as described permits to have metering information pieces available in a number equal to the number of the possible combinations of the values taken by the number of figures of the engine rotational speed and the values taken by the number of figures of the throttle angle, utilizing a reading only storage having a smaller capacity, equal to 1/64 of the capacity which would be necessary to store all of said combinations.

The value of the temperature of the air (5 figures) obtained from the detector 24, is utilized by the microprocessor unit to address a table of 32 values contained in the reading only storage; the cells of such a table contain the coefficients of correction of metering of fuel calculated as a function of the temperature. By so doing, there is determined the coefficient of correction relative to the air temperature, $C_{TA}$.

By a similar procedure there is determined the coefficient of correction relative to the temperature of the cooling water $C_{TH}$.

The central microprocessor unit 36 carries out the correction by multiplying the calculated value $\bar{q}$ by the sum of the various correction coefficients and summing the increment of the value thus obtained to the value $\bar{q}$; thus, there is obtained a value of metering of fuel which is corrected $\bar{q}_c$.

To simplify the multiplication, such coefficients are expressed in percentage on a base 128.

The calculation cycle of the duration of injection is completed with the determination of the number of constant frequency pulses which, on the basis of the dispensing curve of the electroinjector, corresponds to said value of correct metering $\bar{q}_c$.

The calculation which is necessary to determine the number of pulses in the case of electroinjectors which are used, which have a linear operation characteristic, consists in multiplying the value $\bar{q}_c$ by a constant $k_1$ and summing the value thus obtained for a constant $k_2$. The constants $k_1$ and $k_2$ define the dispensing curve which is characteristic for the electroinjectors.

The principal program, in the case in which the acquired engine parameters indicate the operation with motoring over, provides to modify the number of pulses which is equivalent to the correct metering, $\bar{q}_c$ by increasing or decreasing according to whether motoring over begins or ends.

The principal program provides also to modify the number of pulses corresponding to the correct metering, during the engine start stage, by supplying the appropriate additional fuel feed the magnitude of which is stored in the storage 37 in a 32-information table.

The initial value of additional fuel feed is addressed by the temperature of the cooling water and during the start stage passes from said value to the steady flow values according to an algorythm which traces a curve.

The calculation of the duration of the injection is carried out by the microprocessor unit 36 continually and is asynchronous relative to the timing signals delivered by the generators 28 and 30.

The information of duration of injection is at any rate updated at least once in the period of time between two consecutive injection demands.

The timing of the injection is controlled by the microprocessor unit 36 by the performance of the auxiliary programs which are bound to the demands of interruption coming from the generators 28 and 30.

In correspondence with each pulse coming from the generator 28 the microprocessor unit performs the following operations:

it stops the principal program;

it identifies which electroinjector is to be actuated; this is obtained because the microprocessor unit maintains an account of the pulses coming from said generator 28 and resets such an account in correspondence with the pulse coming from the generator 30;

it opens the preselected electroinjector by actuating the control line of the relevant actuator by the relative interface;

it prearranges a timer (39 or 40) so that it counts the number of pulses defined by the principal programme and which represents the duration of the injection;

it controls the so prearranged timer to make the accounting;

it restarts the performance of the principal program.

When the preselected timer terminates the accounting the microprocessor units performs the following operations:

it stops the performance of the principal program;

it checks if meanwhile the duration of the calculated injection has been changed and more particularly if the calculated number of pulses has increased;

if the calculated number of pulses is increased the timer is reloaded with the calculated difference relative to the number of pulses which has been calculated and loaded in the preceding counting step, and is restarted (this occurs when the engine is rapidly accelerated);

if the number of pulses which has been calculated did not increase, it controls the electroinjector to close, deactuating the control line of the relevant actuator;

it restarts the performance of the principal program.

In the case in which the time has been actuated again, when such a timer terminates the accounting, the microprocessor unit performs the following operations:

it stops the principal program;

it controls the closure of the electroinjector by deenergizing the line of control of the relevant actuator;

it restarts the principal program.

The timing procedure is performed by utilizing two timers for driving four electroinjectors, in that the microprocessor unit associates the same timers from time to time to the electroinjector to be actuated for dispensing and leaves it associated to the same electroinjector during the entire time of dispensing. If the dispensing of such electroinjector terminates prior that the dispensing of the next electroinjector is started, the same timer is associated to the latter electroinjector, if, conversely, the dispensing of the first electroinjector is extended beyond the dispensing start of the second electroinjector, the second timer is then associated to said second electroinjector.

On taking into account that the duration of injection of an electroinjector is never extended up to the start of the dispensing of a third electroinjector, such algorythm permits correctly to govern in any situation the duration of injection of each electroinjector.

The regulation and control system suggested herein is widely independent of the kind of microprocessor unit used of the characteristics of its peripheral components such as storages, timers, interfaces, because the programming of the unit concerned has been made with the widest generality of utilization in mind.

I claim:

1. A regulation and control system for the unit of fuel feed to an internal combustion engine, said engine being equipped with air intake ducts and actuators for feeding the engine with fuel, said regulation and control system comprising a first detector of a first engine operational parameter, capable of delivering a discrete number of values taken by such a parameter, each of said value being formed by a preselected number of bits, a second detector of a second engine operational parameter capable of delivering a discrete number of values taken by said parameter each of said values consisting of a preselected number of bits, each couple of values of said first and said second parameters defining an engine operational condition, a third detector of an operational temperature of the engine, capable of delivering a discrete number of values taken by such temperature, each of said values consisting of a preselected number of bits, a first pulse generator operatively connected to the mainshaft and capable of delivering at every engine revolution a pulsed signal composed by a number of pulses equal to the number of fuel-dispensing operations which must take place during each engine revolution, a second pulse generator operatively connected to a shaft rotated at half the RPM of the mainshaft and capable of emitting a properly phased pulse at every engine cycle, a central microprocessor unit (CPU), a reading and writing storage unit (RAM), a reading only storage unit (ROM) containing the calculation programs of the microprocessor unit, the carburation plan of the engine as a function of the two engine operational parameters aforesaid, the carburation correction plan as a function of an engine working temperature, the cells of the storage unit (ROM) relative to the carburation plan containing, each, an information for metering the fuel consisting of a preselected number of bits, the value of which is a function of the quantity of fuel to be fed to the engine at every dispensing step, in the operation condition defined by a couple of values of the two engine operational parameters aforesaid, all the other engine operational parameters being assumed constant, the number of the storage cells being equal to the number of the possible combinations of the values taken by a preselected number of most significant bits of the first engine operational parameter and of the values taken by a preselected number of most significant bits of the second engine operational parameter, the cells of the storage unit aforesaid (ROM) relative to the plan of carburation correction containing, each, an information the value of which is the correction coefficient of the fuel metering as a function of the values taken by said working temperature of the engine, said central microprocessor unit being programmed:

for generating an address of the reading only storage (ROM) composed by the combination of the aforementioned preselected number of the first most significant bits of the numerical value taken by said first engine operational parameter and by the aforesaid preselected number of the first most significant bits of the numerical value taken by the second engine operational parameter;

for identifying by means of such address that cell of the reading only storage in which a first metering information is contained;

for identifying in said reading only storage, in addition to said first metering information three additional metering information pieces, each of which corresponds to the content of the storage cells located in a preselected environmental domain of said address, each of the three cells being identified by algebraically summing certain preselected constants to said address;

for obtaining from the aforesaid four metering information pieces a metering information calculated by an operative interpolation process, the operative elementary module of which uses a preselected number of the least significant bits of each of said first and said second engine operational parameters;

for identifying in said reading only storage the cell containing the correction coefficient corresponding to the engine working temperature, and for utilizing said correction coefficient to modify said calculated correction information according to a preselected procedure;

for calculating from the thermally corrected metering information the utilized metering information expressed in terms of the control magnitude required by the fuel feeding actuators for the engine, the value of said control magnitude being obtained by calculations based on algorythms depending on the operational features of said actuators, and for calculating the instant of command of said fuel feed actuators, utilizing the pulsed signals coming from said first and said second pulse generators, the pulses coming from the first generator being utilized for distinguishing the starting sequential order for the same actuators within a cycle of the engine and for determining the instant of start of each actuator, the pulses coming from the second generator being utilized for defining the beginning of each engine cycle.

2. Regulation and control system according to claim 1, for a phased electronic injection installation of an internal combustion engine comprising, as the actuator for fuel feed, as many electroinjectors as there are cylinders in the engine which require to be driven by a command magnitude which is their duration of dispensing, said regulation and control system being characterized in that it comprises timers having a counting up capacity correlated with the desired accuracy, the number of said timers being a function of the number of injections to be effected during a revolution of the engine and of the maximum duration of the injection, said microprocessor central unit being programmed;

for converting the thermally corrected metering information into an injection duration information, which is the stay open time of an electroinjector, said duration information being expressed in terms of number of constant frequency pulses, calculated as a function of the characteristic operation curve of the electroinjector, starting from said thermally corrected metering information;

for controlling the dispensing by an electroinjector, identifying the injector to be actuated and the instant of start of the actuation, via the pulsed signal delivered by said first pulse generator;

for determining the dispensing time of said electroinjector, by loading on a timer the number of constant frequency pulses, which represents said injection duration time information, carrying out the loading process of said timer as a function of the dynamic condition of the engine evaluated through the degree of variation of one of said engine operational parameters;

for associating during the entire dispensing time, a determined timer to the electroinjector which is being actuated on the basis of an algorythm which, as a function of the characteristics of the dispensing, permits to drive the electroinjector with a number of timers equal to one half the number of the electroinjectors, and for controlling the closure of the electroinjector on completion of the last count up of said timer.

* * * * *